US005283958A

United States Patent [19]

Chang

[11] Patent Number: 5,283,958

[45] Date of Patent: Feb. 8, 1994

[54] ADJUSTABLE SAW GAUGE FIXTURE

[76] Inventor: Chin T. Chang, Chang Nan Rd. 26, Lane 224, Sec. 2,, Changhua, Taiwan

[21] Appl. No.: 983,782

[22] Filed: Nov. 30, 1992

[51] Int. Cl.$^5$ ........................... G01B 3/56; B26D 7/02

[52] U.S. Cl. ........................................ 33/538; 33/626; 83/468; 83/468.3

[58] Field of Search ................. 33/465, 466, 471, 534, 33/538, 626, 640, 641, 645; 83/453, 468, 468.2, 468.3, 468.7, 421

[56] References Cited

U.S. PATENT DOCUMENTS

| | | | |
|---|---|---|---|
| 1,006,948 | 10/1911 | Johnson | 33/534 |
| 2,365,436 | 12/1944 | Saucier | 33/538 |
| 2,547,121 | 4/1951 | Hess | 33/466 |
| 2,719,548 | 10/1955 | Mitchell | 33/465 |
| 2,881,525 | 4/1959 | Johnston | 33/466 |
| 2,884,965 | 5/1959 | Stahl | 33/640 |
| 2,889,757 | 6/1959 | Cole | 33/538 |
| 3,738,211 | 6/1973 | Carter, Sr. | 83/468.3 |
| 4,002,329 | 1/1977 | Petrowski | 83/468.3 |
| 4,315,373 | 2/1982 | Lenz | 33/534 |
| 4,843,728 | 7/1989 | Francis | 33/640 |

FOREIGN PATENT DOCUMENTS 0614340 12/1960 Italy .................................. 83/468.7

*Primary Examiner*—Thomas B. Will
*Attorney, Agent, or Firm*—Thomas R. Vigil

[57] ABSTRACT

An adjustable saw gauge fixture is disclosed including first and second end plates joined by two parallel guide rods and an intermediate screw rod, a movable jaw plate mounted on the parallel guide rods and the screw rod and controlled by an adjusting knob to move along the screw rod pitch by pitch in holding down the workpiece between either end plate, a bolt retained engaged with the screw thread of the screw rod by a spring in holding the movable jaw plate in place, two handles made on the end plates, a miter block made of an angle bar having one end pivoted to the first end plate and an opposite end freely moved toward or apart from said second end plate, a miter gauge having one end fixed to the miter block and an elongated groove peripherally marked with graduations movably secured to the second end plate.

2 Claims, 4 Drawing Sheets 82
8
81
52'
5'
7
2
A
B
24
7
R
3
3
P
4
52
6
5
41

ADJUSTABLE SAW GAUGE FIXTURE

BACKGROUND OF THE INVENTION

1. Field of the Invention

The present invention relates to an adjustable saw gauge fixture adjustably attached to a fence guide bar on a saw bench to hold a miter gauge and the workpiece for cutting.

2. Description of Prior Art

In the process of sawing process, a fixture is generally required to hold the workpiece in place so that a precise cutting can be achieved. Further, different saw gauges may be alternatively used to support the workpiece for different angle cuttings. FIG. 1 illustrates a saw gauge fixture according to the prior art, which is generally comprised of a rectangular base (2), a screw rod (3), two adjusting knobs (4), and a jaw plate (5). The rectangular base (2) has an elongated slot (21) at the middle in longitudinal direction and two unitary base blocks (22), (23) at two opposite ends. The base blocks (22), (23) each has a round hole arranged in line with the elongated slot (21). The screw rod (3) is inserted through the round holes with the two opposite ends thereof respectively attached with the adjusting knobs (4). The adjusting knobs (4) have each an end hole (not shown), into which either end of the screw rod (3) fitted, and a pivot hole (not shown) into which a lock pin (42) is inserted to secure the screw rod (3) in position. The jaw plate (5) is made in a T-shaped structure having a bolt hole (51) at the middle mounted on the outer thread (31) of the screw rod (3). Rotating the adjusting knobs (4) causes the jaw plate (5) to alternatively move back and forth along the screw rod (3), and therefore the range A or B between the jaw plate (5) and either base block (22) or (23) is adjusted according to the size of the workpiece to be cut. Because the jaw plate (5) can only be moved on the screw rod (3) pitch by pitch, it takes much time to move the jaw plate (5) into position. Furthermore, different angle gauges should be used when different angle cuttings are required.

SUMMARY OF THE INVENTION

The present invention has been accomplished under the circumstances in view. According to one aspect of the present invention, a saw gauge fixture is generally comprised of a first end plate and a second end plate joined by two parallel guide rods and an intermediate screw rod, a moveable jaw plate mounted on the parallel guide rods and the screw rod and driven by an adjusting knob to move along the screw rod pitch by pitch by pitch for holding the workpiece to be cut, two handlebars respectively mounted on the first and second end plates, a miter block made of an angle bar having one end pivoted to the first end plate and an opposite end freely moved toward or apart from the second end plate, a miter gauge having one end fixed to the miter block and an elongated groove peripherally marked with graduations movably secured to the second end plate.

According to another aspect of the present invention, a bolt is retained in a hole on the movable jaw plate by a spring, which bolt having a curved bottom notch retained engaged with the screw thread of the screw rod by the spring. Therefore, the jaw plate can be freely moved along the guide rods for quick position change when the bolt is pulled upwards and disengaged from the screw rod.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
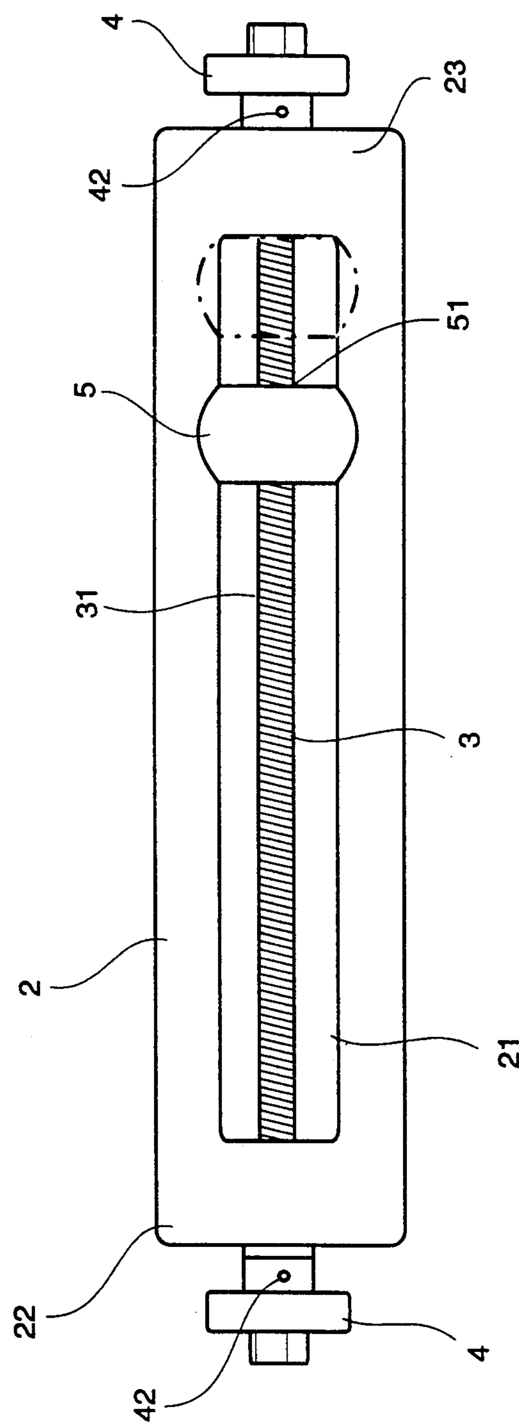
FIG. 1 illustrates a sawing workpiece fixture according to the prior art.
Figure 2:
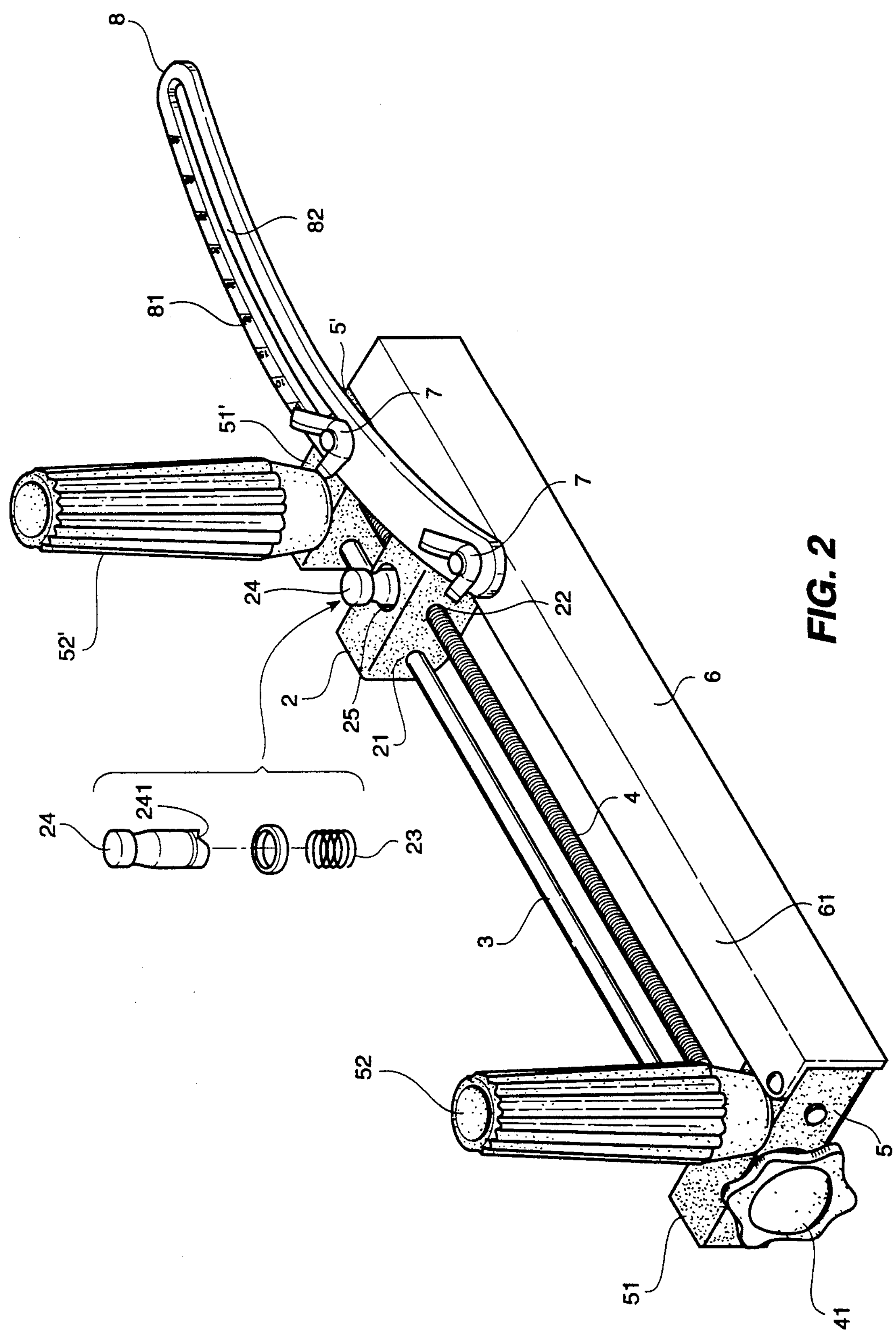
FIG. 2 is an elevational and partly exploded view of the present invention.
Figure 3:
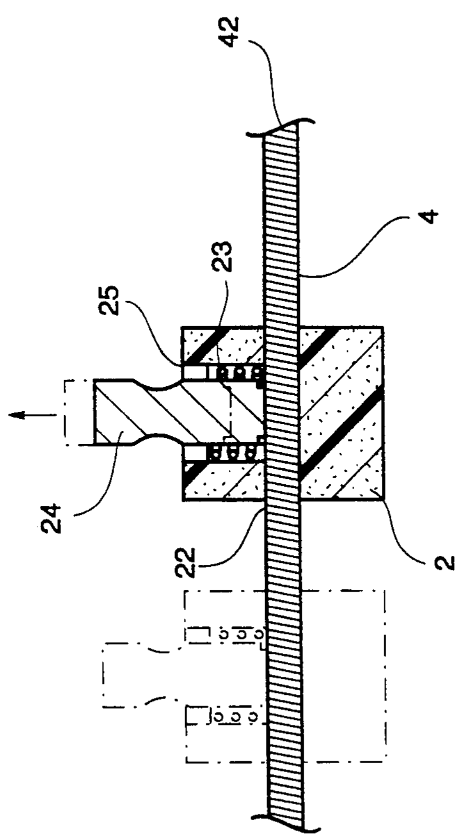
FIG. 3 is a sectional view illustrating that the jaw plate can be freely moved along the guide rods by pulling the bolt upwards.

Referring to FIGS. 2 and 3, a saw gauge fixture as constructed in accordance with the present invention is generally comprised of two end plates 5, 5' joined by two parallel guide rods 3, 3', a screw rod 4 and an angle bar 6, and a movable jaw plate 2 has three throughholes 21, 22, through which the guide rods 3, 3' and the screw rod 4 are inserted respectively, a vertical top hole 25 in communication with the intermediate throughhole 22, and a bolt 24 retained inside the vertical top hole 25 by a spring 23. The bolt 24 has a curved bottom notch 241 retained engaged with the screw thread 42 of the screw rod 4 by the spring 23 (see FIG. 3). An adjusting knob 41 is coupled to the screw rod 4 at one end outside the left-side end plate 5. Two top handles 52,52' are respectively fastened to the top surface 51 or 51' on either end plate 5 or 5'. The angle bar 6 has one longitudinal side wall 61 mounted over the top surface 51,51' of each end plate 5,5' to hold a miter gauge 8. The miter gauge 8 has one end fastened to a hole on the longitudinal side wall 61 of the angle bar 6 by a wing screw 7, an elongated groove 82 peripherally marked with graduations 81 in longitudinal direction, through which another wing screw 7 is inserted to connect the miter gauge 8 to the right-side end plate 5'.

Figure 4:
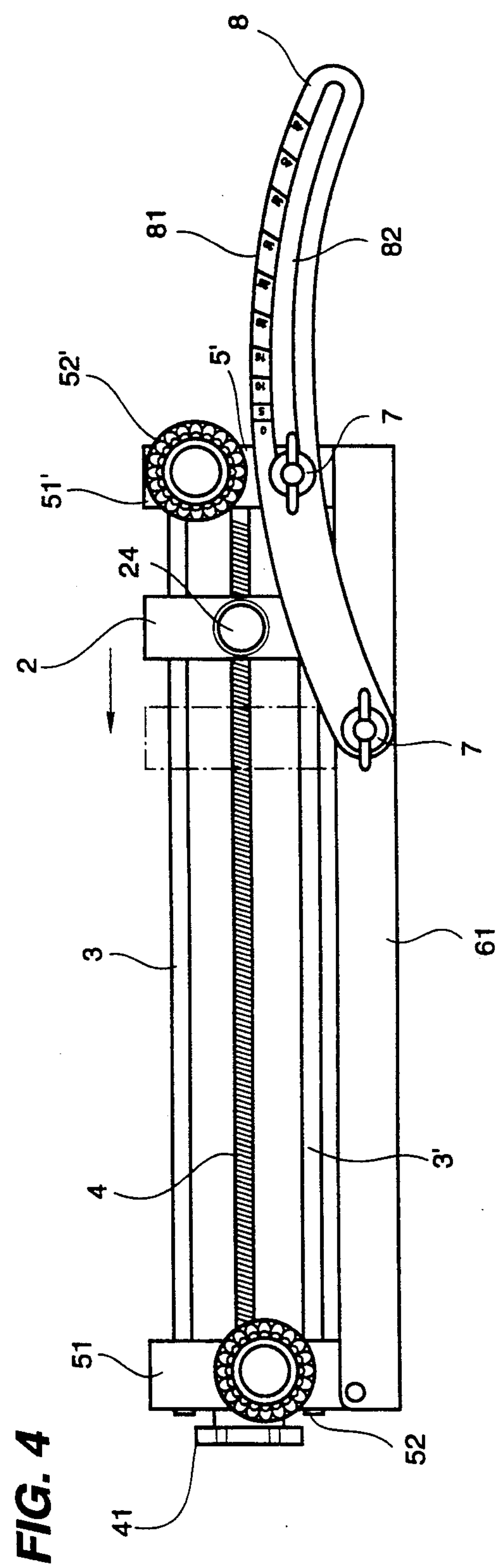
FIG. 4 is a schematic plan view showing that rotating the adjusting knob causes the jaw plate to slide on the guide rods for chucking a workpiece in place.
Figure 5:
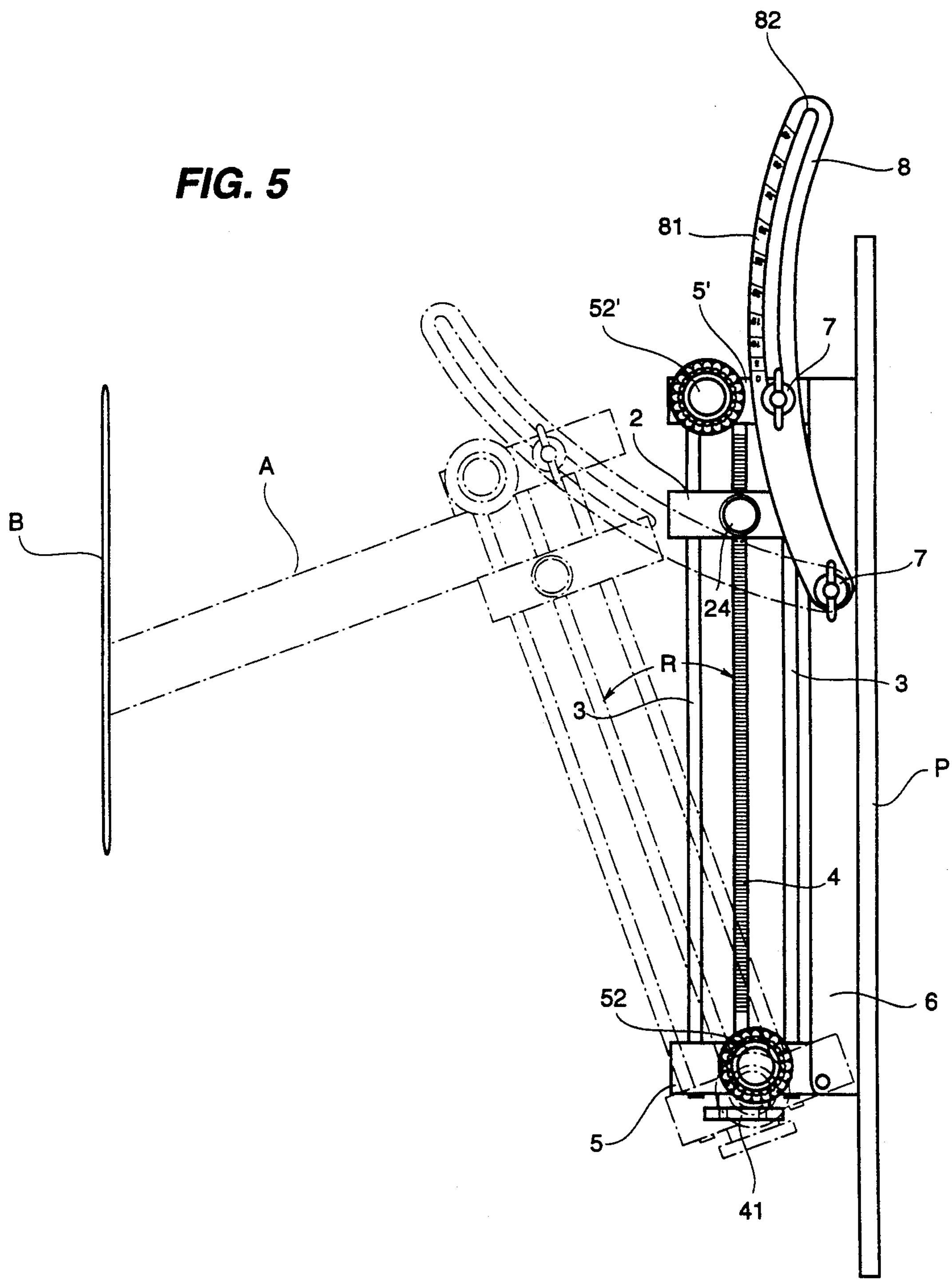
FIG. 5 illustrates that the angle bar can be adjusted to the desired angle for supporting a workpiece simply by adjusting the position of the angle-adjusting plate on the end plate.

Referring to FIGS. 4 and 5, turning the adjustable knob 41 to rotate the screw rod 4 causes the movable jaw plate 2 to move on the screw rod 4 forwards or backwards pitch by pitch. By pulling the bolt 24 upwards to disengage the curved bottom notch 241 from the screw thread 42, the movable jaw plate 2 is allowed to be freely moved on the screw rod 4 and the guide rods 3, 3' to change the distance between either end plate 5 or 5' according to the size of the workpiece to be sawed. During the process of sawing, the angle bar 6 is stopped against the fence guide bar P on the saw bench in parallel with the saw blade B for permitting the workpiece A to be retained between the movable jaw plate 2 and either end plate 5 or 5', and the miter gauge 8 can be adjusted to change the angle R of the movable jaw plate 2 and the end plates 5, 5' on the saw bench so that the workpiece A can be cut according to the desired angle.

What is claimed is:

1. An adjustable saw gauge fixture comprising a first end plate and a second end plate joined by two parallel guide rods and a screw rod, two handles made on said first and second end plates respectively, a movable jaw plate movably mounted on said parallel guide rods and said screw rod, locating means to retain said movable jaw plate to said screw rod in place, an adjusting knob turned to rotate said screw rod in causing said movable jaw plate to be alternatively moved along said screw rod pitch by pitch toward said first or second end plate in holding down a workpiece, a miter gauge carrier made of an angle bar having one end pivoted to said first end plate and an opposite end freely moved toward or apart from said second end plate, a miter gauge having one end fixed to said angle bar by a wing screw and an elongated groove peripherally marked with graduations movably secured to said second end plate by a wing screw.

2. The adjusting saw gauge fixture of claim 1 wherein said locating means comprises a bolt retained in a hole on said movable jaw plate by a spring said bolt having a curved bottom notch retained engaged with the screw thread of said screw rod by said spring.

* * * * *